(12) United States Patent
Porsch

(10) Patent No.: US 12,389,465 B2
(45) Date of Patent: Aug. 12, 2025

(54) METHOD FOR ESTABLISHING A WIRELESS DATA CONNECTION BETWEEN A VEHICLE AND AN EXTERNAL UNIT, CONNECTION ESTABLISHMENT UNIT AND VEHICLE

(71) Applicant: Siemens Mobility GmbH, Munich (DE)

(72) Inventor: Roland Porsch, Speichersdorf (DE)

(73) Assignee: Siemens Mobility GmbH, Munich (DE)

( * ) Notice: Subject to any disclaimer, the term of this patent is extended or adjusted under 35 U.S.C. 154(b) by 711 days.

(21) Appl. No.: 17/618,593

(22) PCT Filed: May 18, 2020

(86) PCT No.: PCT/EP2020/063851
§ 371 (c)(1),
(2) Date: Dec. 13, 2021

(87) PCT Pub. No.: WO2020/249366
PCT Pub. Date: Dec. 17, 2020

(65) Prior Publication Data
US 2022/0361257 A1    Nov. 10, 2022

(30) Foreign Application Priority Data
Jun. 12, 2019  (DE) .................. 10 2019 208 515.6

(51) Int. Cl.
*H04W 76/10* (2018.01)
*H04W 4/42* (2018.01)
(Continued)

(52) U.S. Cl.
CPC ............ *H04W 76/10* (2018.02); *H04W 4/42* (2018.02); *H04W 4/44* (2018.02); *H04W 48/18* (2013.01)

(58) Field of Classification Search
CPC ......... H04W 76/10; H04W 4/42; H04W 4/44; H04W 48/18; H04W 24/08; H04W 48/04;
(Continued)

(56) References Cited
U.S. PATENT DOCUMENTS 9,607,449 B1    3/2017  Chen
10,237,702 B2   3/2019  Henze et al.
(Continued)

FOREIGN PATENT DOCUMENTS

DE        19925570 A1    12/2000
DE      102004055275 A1   5/2006
(Continued)

*Primary Examiner* — Kiet Tang
(74) *Attorney, Agent, or Firm* — Laurence A. Greenberg; Werner H. Stemer; Ralph E. Locher

(57) ABSTRACT

A method for establishing a wireless data connection between a vehicle and an external unit. The method for establishing the wireless data connection between the vehicle and the external unit has the vehicle check whether at least one condition from among one or more predefined conditions for establishing a connection has or have been fulfilled. Depending on the result of the check, the vehicle establishes a wireless data connection to the external unit, for data transmission.

12 Claims, 2 Drawing Sheets

(51) Int. Cl.
*H04W 4/44* (2018.01)
*H04W 48/18* (2009.01)

(58) Field of Classification Search
CPC ..... H04W 4/021; H04W 4/027; H04W 36/32; H04B 1/3822; H04L 69/16
See application file for complete search history.

(56) References Cited

U.S. PATENT DOCUMENTS

| | | |
|---|---|---|
| 10,383,059 B2 | 8/2019 | Lei et al. |
| 2005/0259619 A1* | 11/2005 | Boettle ................ H04W 36/32 370/331 |
| 2008/0287141 A1 | 11/2008 | Vogel et al. |
| 2015/0071115 A1* | 3/2015 | Neff ........................ H04L 43/12 370/254 |
| 2015/0338229 A1* | 11/2015 | Yuan .................. G01C 21/3644 701/539 |
| 2016/0261291 A1* | 9/2016 | Colella ................ H04B 1/3822 |
| 2016/0345341 A1* | 11/2016 | Oliver .................. H04W 4/027 |
| 2016/0366049 A1* | 12/2016 | Achouri .................. H04L 69/16 |
| 2017/0215165 A1 | 7/2017 | Tseng et al. |
| 2018/0176757 A1 | 6/2018 | Kaindl et al. |

FOREIGN PATENT DOCUMENTS

| | | |
|---|---|---|
| DE | 102015107697 A1 | 11/2015 |
| DE | 102015215333 A1 | 2/2017 |
| DE | 102017100545 A1 | 8/2017 |
| DE | 102016221986 A1 | 5/2018 |
| EP | 1210832 B1 | 10/2003 |
| WO | WO 2015165682 A1 | 11/2015 |
| WO | 2017025312 A1 | 2/2017 |

\* cited by examiner

METHOD FOR ESTABLISHING A WIRELESS DATA CONNECTION BETWEEN A VEHICLE AND AN EXTERNAL UNIT, CONNECTION ESTABLISHMENT UNIT AND VEHICLE

FIELD AND BACKGROUND OF THE INVENTION

The invention relates to a method for establishing a wireless data connection between a vehicle and an external unit.

Rail vehicles in particular transmit a multiplicity of data to external units, in particular to stationary units at fixed locations.

Currently, a wireless data connection is established via a cellular mobile-radio network as soon as there is an amount of data available for transmission, or at least the connection establishment is initiated. However, a recurring problem when signal strengths in the mobile radio network are low is that the data connection is cut off or that the establishment of the connection cannot even be completed. Even so, costs are already being incurred while the connection is being established. In this situation, the costs are incurred during the connection establishment regardless of whether data is actually transmitted subsequently.

SUMMARY OF THE INVENTION

It is an object of the invention to disclose an improved method, in particular a cost-effective method, for establishing a wireless data connection between a vehicle and an external unit.

The object is achieved by means of a method for establishing a wireless data connection between a vehicle and an external unit, wherein, according to the invention, in a check conducted by the vehicle, it is checked whether at least one condition out of one or more predefined conditions for establishing a connection has been fulfilled. According to the invention, whether or not a wireless data connection is established by the vehicle to the external unit for the purpose of data transmission is dependent on the result of the check.

In this way, the establishment of the connection can be made dependent on the result of the check. Accordingly, a wireless data connection will not be established in every case.

The check can be carried out whenever data intended for transmission is present in the vehicle. In particular, the vehicle can conduct the check prior to a pending transfer of data to an external unit.

The external unit may be for example a stationary unit, in particular a land-based unit, installed at a fixed location. Furthermore, the external unit may also be another vehicle.

It is beneficial for a data transmission to be started and/or performed once a data connection has been established. The data transmission preferably takes place between the rail vehicle and the external unit. In particular, data can be transferred during the data transmission from the rail vehicle to the external unit via the communications network. The rail vehicle can also retrieve data from the external unit during the data transmission.

The vehicle is preferably a long-haul vehicle. The vehicle may be a bus or a truck, for example. In a preferred embodiment of the invention, the vehicle is a rail vehicle.

Beneficially, the wireless data connection, "data connection" for short, is a data connection via a communications network. Preferably, the communications network is suitable for supporting a wireless data connection. Advantageously, the communications network is suitable, in particular configured, for a wireless data transmission.

It is preferred if the communications network is a cellular mobile-radio network. In principle, the communications network may also be a different communications network for wireless data transmission.

Preferably, at least one data connection parameter is determined by the vehicle on a time-dependent basis. The at least one data connection parameter beneficially describes a state of a communications network that can be utilized for a wireless data connection. In particular, the at least one data connection parameter may describe a state of a communications network that can be utilized for a wireless data connection on a time-dependent basis, i.e. in particular for a respective point in time. The last-mentioned communications network may be the aforementioned communications network.

The data connection parameter may be location-dependent. In particular, the data connection parameter may be dependent on a position of the rail vehicle.

It is advantageous if the condition whether the at least one data transmission parameter exceeds a (respective) predefined threshold value for a predefined time interval is checked.

In particular, the data connection can be established for data transmission when the data transmission parameter exceeds a predefined threshold value for a predefined time interval. In other words: In particular, the data connection can be established when the condition that the data transmission parameter exceeds a predefined threshold value for a predefined time interval has been fulfilled.

The at least one data connection parameter may comprise a signal strength of the communications network. The at least one data connection parameter may further comprise a signal quality of the communications network.

The threshold value predefined for a respective data connection parameter may be fixed.

Furthermore, the threshold value may be dependent on the data that is to be transmitted. In particular, the threshold value may be dependent on a data size, a data volume, a data type and/or a category of the data that is to be transmitted.

If the data connection parameter for the communications network lies below a predefined minimum value, a further data connection parameter for a different, alternative communications network may be determined. Furthermore, the condition whether the further data transmission parameter exceeds the predefined threshold value for a predefined time interval can be checked.

The other, alternative communications network may be a communications network of a different provider, for example.

It is advantageous if the condition whether the data that is to be transmitted corresponds to a predefined data type and/or a predefined category is checked.

For example, the categories "emergency signals", "help request" and/or similar may be predefined.

In particular, the data connection can be established for data transmission when the data that is to be transmitted corresponds to the predefined data type/one of the predefined data types and/or the predefined category/one of the predefined categories.

In this way, the data connection can be established for the data transfer of data to be transmitted that belongs to a predefined data type and/or a predefined category, e.g. for transmission of emergency signals, help requests or similar, regardless of other conditions.

Preferably, a position of the vehicle is determined. Beneficially, the position indicates the location at which the vehicle is at the present time.

In particular, the position may be a current position, in particular at the time of the pending data transmission.

The position of the vehicle may for example comprise GPS coordinates or other coordinates. The position may be determined for example by means of a GPS system or by means of transponders and a calculated speed of the vehicle.

The condition whether the vehicle is located within a particular region may be checked.

For example, the data connection can be established for data transmission when the vehicle is located within a predefined region. The predefined region may for example be a region which is known to have a good data connection availability and/or a good data transmission availability.

For example, the data connection for data transmission can be established when the vehicle is located within a predefined region and in addition a further condition has been fulfilled. The predefined region may for example be a region for which low charges are incurred during the connection establishment and/or during the data transmission, in particular lower charges than outside of said region.

Furthermore, the condition whether the current time corresponds to a predefined time of day may be checked.

The current time may be the time of the pending data transmission. In other words, the current time is a time at which the data that is to be transmitted is present and/or at which a transmission of the data present is pending.

For example, the data connection can be established for data transmission when the current time corresponds to a predefined time of day.

Furthermore, the condition whether a manual permission and/or a manual request for a data transmission is present may be checked.

For example, the data connection can be established for data transmission when a manual permission and/or a manual request for a data transmission is present.

Furthermore, the condition whether a predefined state of the vehicle is present may be checked.

The predefined state of the vehicle may be a fault state, for example. The predefined state may be present, for example, when a specific threshold value is exceeded, when specific diagnostic messages occur, and/or similar.

One or more of said conditions may have been/may be predefined for checking. Furthermore, other conditions may also have been/may also be predefined.

If, in particular temporarily, no condition has been predefined, a wireless data connection for data transmission to the external unit can be established and/or can remain established without a check by the vehicle. In particular, the data connection can be established when data that is to be transmitted is present.

If, for example, the result of the check is that at least one condition has been fulfilled, the vehicle preferably establishes a data connection to the external unit. It is furthermore beneficial if the vehicle initiates a data transmission to the external unit while there is an established data connection.

If, for example, the result of the check is that no condition has been fulfilled, it is beneficial that no data connection is established. It stands to reason in this way that the data to be transmitted cannot be transmitted. If the result of the check is that no condition has been fulfilled, the data that is to be transmitted is preferably stored inside the vehicle.

The data connection can be established at a later time if at least one of the conditions is fulfilled. Then, in particular once the data connection is established, the transmission of the stored data can begin/take place.

In this way, the establishment of the data connection can be dependent on the result of the condition check. In particular, in this way a data connection can be established only when at least one condition has been fulfilled. In all other cases it is beneficial if no data connection is established. Cost savings can be achieved in this way.

The invention and/or the described developments may be realized—at least in part, as well as in its or their entirety—both in software and in hardware, the latter using a special electrical circuit, for example.

Furthermore, a realization of the invention and/or of a described development is possible—at least in part, as well as in its or their entirety—by means of a computer-readable storage medium on which there is stored a computer program which, when it is executed on a computer, implements the invention or its development.

The invention and/or the described developments may also be realized—at least in part, as well as in its or their entirety—by means of a computer program product which comprises a storage medium on which there is stored a computer program which, when it is executed on a computer, implements the invention and/or the developments.

The invention is further directed to a connection establishment unit for a vehicle for the purpose of establishing a wireless data connection between the vehicle and an external unit.

According to the invention, the connection establishment unit is configured to conduct a check in order to verify whether at least one condition out of one or more predefined conditions for connection establishment has been fulfilled. Depending on the result of the check, the connection establishment unit is further configured to establish a wireless data connection to the external unit for data transmission purposes.

The connection establishment unit can be utilized for performing the aforementioned method.

The invention is further directed to a vehicle comprising the aforementioned connection establishment unit and/or one of its developments.

It is advantageous if the vehicle is a rail vehicle.

The vehicle may furthermore be a bus or a truck, for example.

It is beneficial if the vehicle is a long-haul vehicle.

The foregoing description of advantageous embodiments of the invention includes numerous features which are reproduced, in some cases combined into multiples, in the individual dependent claims. However, these features may beneficially also be considered individually and put together to form further meaningful combinations. In particular, these features may each be combined individually and in any suitable combination with the inventive method, the inventive connection establishment unit and the inventive vehicle. Accordingly, method features are also to be regarded as formulated in terms of a physical entity as a characteristic of the corresponding device unit, and vice versa.

Even if certain terms are used in each case in the singular or in conjunction with a cardinal number in the description or in the claims, the scope of the invention in respect of these terms is not intended to be limited to the singular or the respective cardinal number.

The above-described characteristics, features and advantages of this invention, as well as the manner in which these are realized, will become clearer and more readily understandable in connection with the following description of the exemplary embodiments, which are explained in more detail in conjunction with the drawings. The exemplary embodiments serve to explain the invention and do not limit the invention to the combination of features disclosed therein, including not in relation to functional features. Moreover, features of any exemplary embodiment that are suitable therefor may also be considered explicitly in isolation, removed from an exemplary embodiment, incorporated into another exemplary embodiment in order to supplement the latter, and combined with any desired feature of the claims.

DETAILED DESCRIPTION OF THE INVENTION

Figure 1:
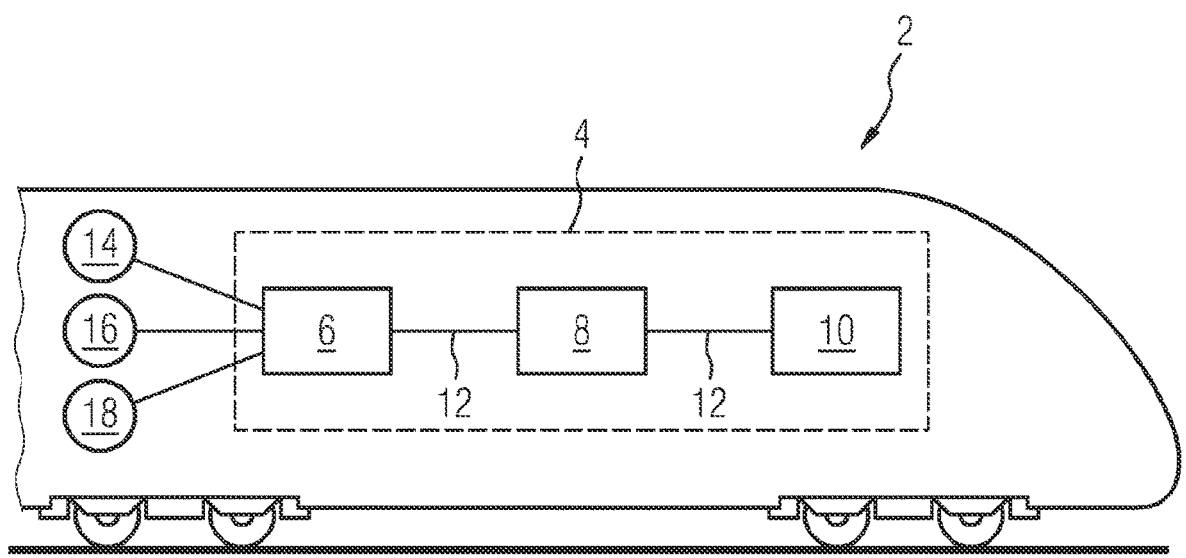
FIG. 1 shows a rail vehicle comprising a connection establishment unit for establishing a wireless data connection.

FIG. 1 schematically illustrates a rail vehicle 2 comprising a connection establishment unit 4 for establishing a wireless data connection between the rail vehicle 2 and an external unit (not shown).

The connection establishment unit 4 comprises a checking unit 6 which is configured to conduct a check in order to verify whether at least one condition out of one or more predefined conditions for establishing a connection has been fulfilled.

The connection establishment unit 4 further comprises a subunit 8 which, depending on the result of the check, is configured to establish a wireless data connection to the external unit for data transmission purposes.

In addition, the connection establishment unit 4 comprises a data transmission unit 10. The data transmission unit 10 is configured to transfer data that is to be transmitted to the external unit when the data connection has been established.

The checking unit 6 is connected to the subunit 8 via a data cable 12. The subunit 8 is also connected to the data transmission unit 10 via a data cable 12.

The subunit 8 and the data transmission unit 10 may also be implemented as a common unit.

The rail vehicle 2 comprises a localization unit 14 for determining a position of the rail vehicle 2. The localization unit 14 may be embodied as a GPS sensor, for example.

The rail vehicle 2 also comprises a timer 16, in particular a clock, for determining a current time.

The rail vehicle 2 further comprises a determination unit 18. The determination unit 18 is configured to determine at least one data connection parameter on a time-dependent basis. Beneficially, the at least one data connection parameter describes a state of a communications network that can be utilized for a wireless data connection.

The localization unit 14, the timer 16 and the determination unit 18 are each connected to the checking unit 6 via a data cable 12.

The rail vehicle 2 may further comprise sensors and/or a controller for determining diagnostic messages (not shown), which can likewise be connected to the checking unit 6 via a data cable 12 (not shown).

Figure 2:
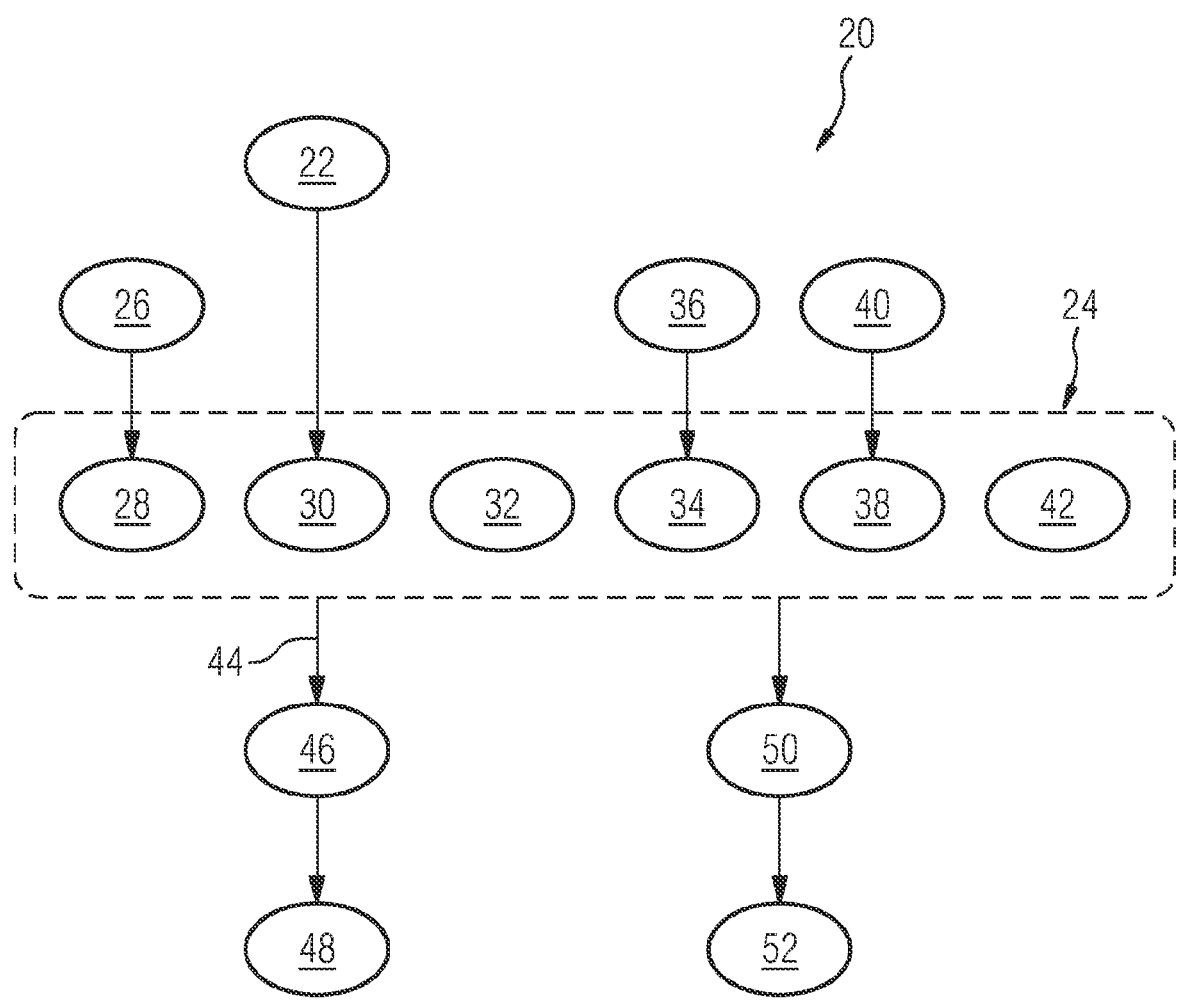
FIG. 2 shows a flowchart which illustrates a method for establishing a wireless data connection between the vehicle from FIG. 1 and an external unit.

FIG. 2 shows a flowchart 20 which illustrates the method for establishing a wireless data connection between the rail vehicle 2 from FIG. 1 and an external unit.

When data 22 to be transmitted is present in the rail vehicle 2, a check is carried out by means of the checking unit 6 in a check 24 to determine whether at least one condition out of one or more predefined conditions for connection establishment has been fulfilled. The check 24 is conducted by the rail vehicle 2 by means of the checking unit 6.

The determination unit 18 of the rail vehicle 2 determines at least one data connection parameter 26 on a time-dependent basis. The at least one data connection parameter 26 describes a state of a communications network that can be utilized for a wireless data connection. The communications network may be a cellular mobile-radio network, for example.

In this example, two data connection parameters 26 are determined, specifically a signal strength of the communications network and a signal quality of the communications network. In other words, a signal strength of the communications network and a signal quality of the communications network, for example, are determined as data connection parameters 26 on a time-dependent basis.

The data connection parameters 26 are normally dependent on a position of the rail vehicle 2. When the rail vehicle 2 is traveling on a section of track, the data connection parameters 26 are in this way dependent on time. Even when the rail vehicle 2 is stationary, at least one data connection parameter 26, in particular at least the signal quality of the communications network, may be dependent on time, due, for example, to a utilization of the capacity of the communications network varying with time.

In the check 24, the condition 28 whether the data connection parameters 26 exceed a respective predefined threshold value for a predefined time interval is checked.

The respective threshold value may be dependent on the data that is to be transmitted. Thus, for example, the threshold values for location data relating to the (in particular time-dependent) position of the rail vehicle 2 may be higher than for other data that is to be transmitted.

Furthermore, the threshold values may be greater for data to be transmitted that has a greater data volume, for example, than for data having a smaller data volume. In particular, the data volume is to be considered in each case in comparison with a predefined comparison volume. In other words, the greater data volume is beneficially greater than the predefined comparison volume (—smaller analogously).

Also in the check 24, the condition 30 whether the data to be transmitted corresponds to a predefined category is checked. In this case, the categories "emergency signals" and "help request", for example, are predefined. In other words, it is checked, for example, whether the data to be transmitted corresponds to at least one of the predefined categories "emergency signals" or "help request".

In the check, the condition 32 whether a predefined state of the rail vehicle 2 is present is checked, in particular in addition or alternatively. The predefined state is, for example, a fault state of the rail vehicle 2. The predefined state may be present, for example, when a specific threshold value is exceeded, when specific diagnostic messages occur and/or similar.

In the check 24, the condition 34 whether the rail vehicle 2 is located within a predefined region is also checked. To check this condition 34, the position 36 of the rail vehicle 2 is determined using the localization unit 14 and relayed to the checking unit 6. The condition 34 whether the rail vehicle 2 is located within a predefined region is then checked using the position 36 of the rail vehicle 2.

A first predefined region may be, for example, a region which is known to have good data connection availability and/or good data transmission availability. For example, the first predefined region may be an urban area which is known for having a good level of data connection availability and/or a good level of data transmission availability.

A second predefined region may be, for example, a region for which low charges are incurred during the connection establishment and/or during the data transmission, in particular lower charges than outside of said region. For example, roaming charges and/or other supplementary charges may be incurred outside of the second predefined region.

In the check 24, the condition 38 whether the current time 40 corresponds to a predefined time of day is checked. To check this condition 38, the current time 40 is determined using the timer 16 and relayed to the checking unit 6.

The predefined time of day can be a period of time within which data transmitted to the external unit may also be evaluated. In particular when the external unit is a control room, the predefined time of day may correspond to opening hours of the external unit.

Also checked in the check 24 is the condition 42 whether a manual permission and/or a manual request for a data transmission are/is present.

Depending on the result of the check 24, a wireless data connection is established for data transmission to the external unit (connection establishment 46). In particular, the wireless data connection may be established 46 when the result of the check is that at least one of the conditions has been fulfilled (fulfillment 44).

In order to establish the connection 46, the checking unit 6 transmits—depending on the result of the check 24—a corresponding command for connection establishment 46 to the subunit 8 of the connection establishment unit 4, which thereupon establishes the wireless data connection 46 to the external unit for data transmission purposes. In this way, the connection is established 46 in accordance with the result of the check. During the connection establishment 46, a wireless data connection is established by the rail vehicle 2 to the external unit. In particular, during the connection establishment 46, the wireless data connection is established via the aforementioned communications network.

When the wireless data connection for data transmission via the communications network has been established, i.e. after the connection establishment 46, the data 22 to be transferred is transmitted by the rail vehicle 2 to the external unit (data transmission 48).

When the condition 28 that the data connection parameters 26 exceed a respective predefined threshold value for a predefined time interval has been fulfilled (fulfillment 44), the data connection is established 46 for the data transmission. The data 22 that is to be transferred is then transmitted 48 to the external unit.

In this way, the connection establishment 46 can only be initiated provided an availability of the data connection for the predefined period of time was assured. In particular, this ensures that the connection establishment 46 cannot be initiated unless a data connection of sufficient quality is available for the predefined period of time.

In this way it is possible to dispense with a connection establishment in the event of poor availability of the data connection or poor quality of the data connection. Cost savings can be made in this way.

The condition 28 whether the data connection parameters 26 exceed a respective predefined threshold value for a predefined time interval can also be combined with further conditions (see below).

If the respective threshold value is dependent on the data 22 that is to be transmitted, location data relating to the (in particular time-dependent) position of the rail vehicle 2, for example, can only be transmitted when higher data transmission parameters 26 apply, in particular at higher signal strength and higher signal quality, than other data 22 that is to be transmitted, such as diagnostic messages, for example. If the respective threshold value is dependent on the data 22 that is to be transmitted, data 22 to be transmitted that has a greater data volume can only be transmitted when higher data transmission parameters 26 apply than data having a smaller data volume.

It is possible that when the data connection parameters 26 for the communications network lie below a predefined minimum value, in particular for a predefined period of time, a further data connection parameter 26 for a different, alternative communications network is determined (not shown explicitly). The condition 28 whether the further data connection parameters 26 exceed the respective predefined threshold value for a predefined time interval can then be checked.

When the condition 30 that the data to be transmitted corresponds to one of the predefined categories has been fulfilled (fulfillment 44), the data connection is established for data transmission (connection establishment 46). The data 22 to be transferred belonging to one of the predefined categories is then transmitted 48 to the external unit.

In this way, a data transmission 48 of data 22 to be transmitted belonging to one of the predefined categories "emergency signals" or "help requests" is initiated in all circumstances. Even if the connection is poor and/or is cut off, the data connection is established 46 and the data is transmitted 48. Increased costs—due, for example, to losses of the connection—are discounted in favor of safety in the case of data 22 to be transmitted belonging to one of the predefined categories.

When the condition 32 that the predefined state of the rail vehicle 2, in particular a fault state of the rail vehicle 2, is present has been fulfilled (fulfillment 44), the data connection is established 46 for data transmission. The data to be transferred is then transmitted 48 to the external unit.

In this way, a data transmission 48 of data 22 to be transmitted if the predefined state of the rail vehicle 2 is present, in particular if a fault state of the rail vehicle 2 is present, is initiated in all circumstances. Increased costs—due, for example, to losses of the connection—are discounted in favor of safety if the predefined state of the rail vehicle 2 is present, in particular if a fault state of the rail vehicle 2 is present.

When the condition 34 that the rail vehicle 2 is located within the first predefined region, in particular within the predefined urban area, has been fulfilled 44, the data connection is established 46 for data transmission.

In this way, the connection establishment 46 can be initiated when the rail vehicle 2 is located within the first predefined region which is known to have good data connection availability and/or good data transmission availability. Cost savings can be achieved in this way.

Furthermore, when the condition 42 that a manual permission and/or a manual request for a data transmission are/is present has been fulfilled 44, the data connection is established 46 for data transmission. In this way, the connection establishment 46 can be initiated manually in exceptional cases.

It can also be checked in the check 24 whether a combination of conditions has been fulfilled:

If the condition 34 that the rail vehicle 2 is located within the second predefined region, for which lower charges are incurred during the connection establishment and/or during the data transmission than outside thereof, and the condition 28 that the data connection parameters 26 exceed a respective predefined threshold value for a predefined time interval have been fulfilled (fulfilment 44), then the data connection is established 46 for data transmission.

If the condition 38 that the current time 40 corresponds to a predefined time of day and the condition 28 that the data connection parameters 26 exceed a respective predefined threshold value for a predefined time interval have been fulfilled (fulfillment 44), then the data connection is established 46 for data transmission.

Other combinations of conditions are possible.

To sum up, the connection is established 46 only when at least one of the conditions 28, 30, 32, 34, 38, 42 has been fulfilled. A combination of conditions may also be fulfilled.

If none of the predefined conditions 28, 30, 32, 34, 38, 42 has been fulfilled, i.e. in all other cases, no data connection is established (abort 50).

If the result of the check 24 is that no condition 28, 30, 32, 34, 38, 42 has been fulfilled, no data connection is established 50 and the data 22 to be transmitted is stored inside the rail vehicle 2 (storage 52). The data connection can be established at a later time if at least one condition is fulfilled. The transmission of the stored data can then start/be performed.

In principle, it is possible that only some of the conditions 28, 30, 32, 34, 38, 42 are predefined. Furthermore, other conditions may also be predefined.

Should no conditions be predefined, i.e. be present, for a period of time, then if data 22 to be transmitted is present, a data connection is established 46 in this period of time.

Although the invention has been illustrated and described in more detail on the basis of the preferred exemplary embodiments, the invention is not limited by the disclosed examples and other variations may be derived herefrom by the person skilled in the art without leaving the scope of protection of the invention.

The invention claimed is:

1. A method of establishing a wireless data connection between a vehicle and an external unit, the method comprising:
   performing a check by the vehicle for checking whether at least one condition out of one or more predefined conditions for connection establishment has been fulfilled; and
   depending on a result of the check, establishing by the vehicle a wireless data connection for data transmission between the vehicle and the external unit; and
   determining by the vehicle at least one data connection parameter as a function of time, the at least one data connection parameter describing a state of a communications network that can be utilized for the wireless data connection, checking a condition whether or not the at least one data connection parameter exceeds a respective, predefined threshold value for a predefined time interval, and the predefined threshold value being dependent on data to be transmitted, and the predefined threshold value being dependent on a data size, a data volume and/or a category of the data that is to be transmitted;
   if the result of the check is that at least one of the predefined conditions has been fulfilled, establishing a data connection to the external unit and when the data connection is established, beginning a data transmission to the external unit; and
   if the result of the check is that no predefined condition has been fulfilled, not establishing a data connection, and storing the data to be transmitted inside the vehicle; and
   carrying out the check whenever data intended for transmission is present in the vehicle.

2. The method according to claim 1, wherein the at least one data connection parameter comprises a signal strength of the communications network and/or a signal quality of the communications network.

3. The method according to claim 1, which comprises:
   when the data connection parameter for the communications network lies below a predefined minimum value, determining a further data connection parameter for a different, alternative communications network; and
   checking the condition whether or not the further data connection parameter exceeds the predefined threshold value for a predefined time interval.

4. The method according to claim 1, which comprises checking the condition whether data to be transmitted corresponds to a predefined data type and/or a predefined category.

5. The method according to claim 1, which comprises determining a position of the vehicle and checking the condition whether or not the vehicle is located within a predefined region.

6. The method according to claim 1, which comprises checking the condition whether or not a current time corresponds to a predefined time of day.

7. The method according to claim 1, which comprises checking the condition whether or not at least one of a manual permission or a manual request for a data transmission is present.

8. The method according to claim 1, which comprises checking the condition whether or not a predefined state of the vehicle is present.

9. The method according to claim 1, which comprises establishing the data connection at a later time when at least one of the conditions is fulfilled and then initiating the transmission of the data stored in the vehicle.

10. A connection establishment unit for a vehicle for establishing a wireless data connection between the vehicle and an external unit, the connection establishment unit being configured:
   to conduct a check in order to verify whether or not at least one condition out of one or more predefined conditions for connection establishment has been fulfilled; and
   depending on a result of the check, to establish a wireless data connection to the external unit for data transmission;
   to determine by the vehicle at least one data connection parameter as a function of time, the at least one data connection parameter describing a state of a communications network that can be utilized for the wireless data connection, checking a condition whether or not the at least one data connection parameter exceeds a respective, predefined threshold value for a predefined time interval, and the predefined threshold value being dependent on data to be transmitted, and the predefined threshold value being dependent on a data size, a data volume and/or a category of the data that is to be transmitted;
   if the result of the check is that at least one of the predefined conditions has been fulfilled, establish a data connection to the external unit, and when the data connection is established, begin a data transmission to the external unit;

if the result of the check is that no predefined condition has been fulfilled, no data connection is established, and the data to be transmitted is stored inside the vehicle; and carry out the check whenever data intended for transmission is present in the vehicle.

11. A vehicle, comprising a connection establishment unit according to claim 10.

12. The vehicle according to claim 11, being a rail vehicle.

* * * * *